US008108861B2

(12) United States Patent
Ino

(10) Patent No.: US 8,108,861 B2
(45) Date of Patent: Jan. 31, 2012

(54) INFORMATION MANAGEMENT APPARATUS AND METHOD, RECORDING MEDIUM, AS WELL AS PROGRAM FOR SCHEDULING A RECORDING OF AN EVENT

(75) Inventor: Yuji Ino, Tokyo (JP)

(73) Assignee: Sony Corporation, Tokyo (JP)

( * ) Notice: Subject to any disclaimer, the term of this patent is extended or adjusted under 35 U.S.C. 154(b) by 1306 days.

(21) Appl. No.: 11/214,243

(22) Filed: Aug. 29, 2005

(65) Prior Publication Data
US 2006/0048152 A1  Mar. 2, 2006

(30) Foreign Application Priority Data
Aug. 31, 2004  (JP) ................ P2004-253594

(51) Int. Cl.
G06F 9/46 (2006.01)
G06F 3/00 (2006.01)
H04N 7/16 (2006.01)
H04N 7/10 (2006.01)
H04N 7/173 (2006.01)
H04N 5/765 (2006.01)
H04N 5/78 (2006.01)

(52) U.S. Cl. ........... 718/102; 725/9; 725/22; 725/32; 725/37; 725/86; 386/200; 386/278; 386/314

(58) Field of Classification Search .......... 718/100; 345/440; 709/201; 702/1; 710/1
See application file for complete search history.

(56) References Cited

U.S. PATENT DOCUMENTS

| 5,949,954 | A | 9/1999 | Young et al. | |
|---|---|---|---|---|
| 6,353,461 | B1 | 3/2002 | Shore et al. | |
| 6,430,594 | B1* | 8/2002 | Akiyama et al. | 718/108 |
| 6,647,448 | B1* | 11/2003 | Brelin | 710/107 |
| 6,721,778 | B1* | 4/2004 | Smith et al. | 718/103 |
| 7,069,185 | B1* | 6/2006 | Wilson et al. | 702/188 |
| 7,082,605 | B2* | 7/2006 | Alletson et al. | 718/100 |
| 7,348,979 | B2* | 3/2008 | Tso | 345/440 |
| 2004/0078817 | A1* | 4/2004 | Horowitz et al. | 725/58 |
| 2006/0248203 | A1* | 11/2006 | Yamaoka et al. | 709/228 |
| 2007/0110395 | A1* | 5/2007 | Ishida et al. | 386/95 |

FOREIGN PATENT DOCUMENTS

| EP | 1 126 701 | 8/2001 |
|---|---|---|
| JP | 10 276149 | 10/1998 |
| JP | 10 276150 | 10/1998 |
| JP | 2001 60927 | 3/2001 |
| JP | 2003 229827 | 8/2003 |
| WO | WO 99 05821 | 2/1999 |

* cited by examiner

Primary Examiner — Emerson Puente
Assistant Examiner — Adam Lee
(74) Attorney, Agent, or Firm — Frommer Lawrence & Haug LLP; William S. Frommer; Thomas F. Presson

(57) ABSTRACT

An information management apparatus presents an unexpected event to all users.
This apparatus displays time ranges of scheduled events from the start time to the end time along a time axis based on an operation performed to schedule the start time and end time of the events. Further, this apparatus displays a time range of an unexpected event along the same time axis on the same screen based on an operation corresponding to a start of the unexpected event such that the time of the operation is set as a starting point and the time range of the unexpected event is extended as time elapses until an operation corresponding to an end of that unexpected event is performed.

19 Claims, 12 Drawing Sheets

INFORMATION MANAGEMENT APPARATUS AND METHOD, RECORDING MEDIUM, AS WELL AS PROGRAM FOR SCHEDULING A RECORDING OF AN EVENT

CROSS REFERENCES TO RELATED APPLICATIONS

The present invention contains subject matter related to Japanese Patent Application JP 2004-253594 filed in the Japanese Patent Office on Aug. 31, 2004, the entire contents of which being incorporated herein by reference.

BACKGROUND OF THE INVENTION

1. Field of the Invention

The present invention relates to an apparatus, a method, and so forth for managing an event that is scheduled in advance and an event that occurs unexpectedly in a unified manner.

2. Description of the Related Art

Currently, a recording, editing, and transmitting system using a video server is introduced in a television broadcasting station, and a method of recording a material (video data and the like) in this system is mainly categorized into the following two methods of (a) and (b).

(a) An operator (a person in charge of recording a material in a broadcasting station) sets a schedule in advance for the scheduled start time and scheduled end time of recording, and so the recording is performed automatically from the scheduled start time until the scheduled end time.

(b) In case that a necessity to perform recording occurs unexpectedly, the recording is started by a manual operation of an operator.

In those systems in the past, since the scheduled start time and scheduled end time of the recording which is scheduled by the above-described method (a) are displayed as a list on a screen, all operators (the operator who actually set the schedule and also the other operators) can easily comprehend this schedule. However, with respect to the recording which is started unexpectedly by the above-described method (b), it is difficult for other operators than the operator who actually started the recording to know the present situation (whether the recording still continues, or the recording has already been ended).

Hence, there is a possibility that after recording of a material A is started, for example, using the method (b), another operator happens to schedule recording of a material B using the method (a) by setting time as the scheduled start time before the end of the recording of the material A, and so the recording of the material A is interrupted by the recording of the material B.

SUMMARY OF THE INVENTION

In view of the above situations, the present invention is made to enable all persons in charge of managing a event to know easily both of an event scheduled in advance and an event occurred unexpectedly, such as both the recording event by the above-described method (a) and the recording event by the above-described method (b).

In order to solve this problem, an information management apparatus according to an embodiment of the present invention is configured to have first operation means for scheduling the start time and end time of an event, second operation means for performing an operation corresponding to the start and end of an unexpected event, and display control means with which a time range of the event scheduled by the first operation means from the start time to the end time is displayed along a time axis on a screen of display means and with which a time range of the unexpected event is displayed along this time axis on this screen of this display means such that the time of the operation performed by the second operation means correspondingly to the start of the unexpected event is set as a start point and the time range of the unexpected event is extended as time elapses until the second operation means perform an operation corresponding to the end of the unexpected event.

This information management apparatus includes the first operation means for scheduling the start time and end time of the event in advance and the second operation means for operating correspondingly to the start and end of the unexpected event.

Further, when an event is scheduled by the first operation means, the time range of the event from the start time to the end time is displayed along the time axis of the screen of the display means.

Further, when the second operation means is operated correspondingly to the start of the unexpected event, the time range of the unexpected event is displayed along the same time axis on the same screen such that the time of the operation is set as the start point and this time range is extended as time elapses until the second operation means perform the operation of corresponding to the end of the unexpected event.

Accordingly, it is possible to know the occurrence of the unexpected event by this display; it can be judged that the unexpected event still continues while this time range keeps extending; and it can be judged that the unexpected event has already ended when this time range does not extend any further.

Thus, a static display of the time range of the event scheduled in advance and a dynamic display of the time range of the unexpected event are performed along the same time axis on the same screen. Accordingly, all persons in charge of managing an event can understand easily and visually both the event scheduled in advance and the unexpected event.

Here, it is preferable as an example of the information management apparatus that the first operation means and second operation means each select a system from a plurality of systems to perform operations, and that the display control means arranges display columns with respect to the plurality of systems in parallel along the time axis and displays the time ranges in the display columns with respect to each of the systems selected by the first operation means and second operation means.

Hence, the static display of the time range of the event scheduled in advance and the dynamic display of the time range of the unexpected event are performed along the same time axis on the same screen with respect to the plurality of systems. Accordingly, in the case where an unexpected event occurs and still continues in a certain system, the system can easily be avoided and an event can be scheduled in another system. With this, an event can be scheduled while easily coordinating with an unexpected event.

Further, as an example, it is preferable that an event managed by the information management apparatus is the recording of data supplied from the outside. With that, since all persons in charge can easily and visually know both of a recording event scheduled in advance and an unexpected recording event, it becomes possible to prevent such a situation that after a start of recording an unexpected data, another person in charge happens to schedule recording of another material by setting the time before the end of the previous recording as the scheduled start time (recording of an unexpected material is interrupted by recording of another material).

Next, an information management method according to an embodiment of the present invention includes: a first step of displaying a time range of a scheduled event from the start time to the end time along the time axis on the screen of display means based on an operation to schedule the start time and end time of the event, and a second step of displaying a time range of an unexpected event along the time axis on the screen of the display means based on an operation corresponding to the start of the unexpected event such that the time of the operation is set as a starting point and the time range of the unexpected event is extended as time elapses until an operation corresponding to the end of the unexpected event is performed.

Further, a recording medium read by a computer according to an embodiment of the present invention is a recording medium, in which a program is recorded to make a computer execute: a first step of displaying a time range of a scheduled event from the start time to the end time along the time axis on the screen of display means based on an operation to schedule the start time and end time of the event, and a second step of displaying a time range of an unexpected event along this time axis on this screen of the display means based on an operation corresponding to the start of the unexpected event such that the time of the operation is set as a starting point and the time range of the unexpected event is extended as time elapses until an operation corresponding to the end of the unexpected event is performed.

Further, a program according to an embodiment of the present invention is a program which makes a computer execute: a first step of displaying a time range of a scheduled event from the start time to the end time along the time axis on the screen of display means based on an operation to schedule the start time and end time of the event, and a second step of displaying a time range of an unexpected event along this time axis on this screen of this display means based on an operation corresponding to the start of the unexpected event such that the time of the operation is set as a starting point and the time range of the unexpected event is extended as time elapses until an operation corresponding to an end of the unexpected event is performed.

In the information management method, the computer that executes the program recorded in the recording medium, and the computer that executes this program, when the operation to schedule the start time and end time of an event is performed, the time range of the scheduled event from the start time to the end time is displayed along the time axis on the screen of the display means.

Further, when the operation corresponding to the start of an unexpected event is performed, the time range of the unexpected event is displayed along the same time axis on the same screen such that the time of the operation is set as the starting point and this time range is extended as time elapses until performing the operation corresponding to the end of the unexpected event.

Accordingly, it is possible to know by this display the occurrence of an unexpected event; it can be judged that the unexpected event still continues while this time range keeps extending; and it can be judged that this unexpected event has already ended when this time range does not extend any further.

Thus, the static display of the time range of the event scheduled in advance and the dynamic display of the time range of the unexpected event are performed along the same time axis on the same screen. Accordingly, all persons in charge of managing an event can easily and visually know both the event scheduled in advance and the unexpected event.

According to the embodiments of the present invention, since the static display of the time range of an event scheduled in advance and the dynamic display of the time range of an unexpected event are performed along the same time axis on the same screen, there is such effectiveness that all persons in charge of managing events can easily and visually know both the event scheduled in advance and the unexpected event.

In addition, in the case where an unexpected event occurs in a certain system and still continues, the system can easily be avoided and an event can be scheduled in another system, and therefore there is also such effectiveness that an event can be scheduled while easily coordinating with an unexpected event.

Furthermore, since all persons in charge can easily and visually understand both of a recording event scheduled in advance and a recording event occurred unexpectedly, such a situation can also be prevented that after the start of recording unexpected data, another person in charge happens to schedule recording of another material by setting the time before the end of the recording of the unexpected data as the scheduled start time (recording of an unexpected material is interrupted by recording of another material).

DESCRIPTION OF THE PREFERRED EMBODIMENTS

Hereinafter, an embodiment of the present invention is specifically explained, using the accompanied drawings. Note that in the followings an explanation is made with respect to an example to which the present invention is applied to a recording, editing, and transmitting system in a television broadcasting station.

Figure 1:
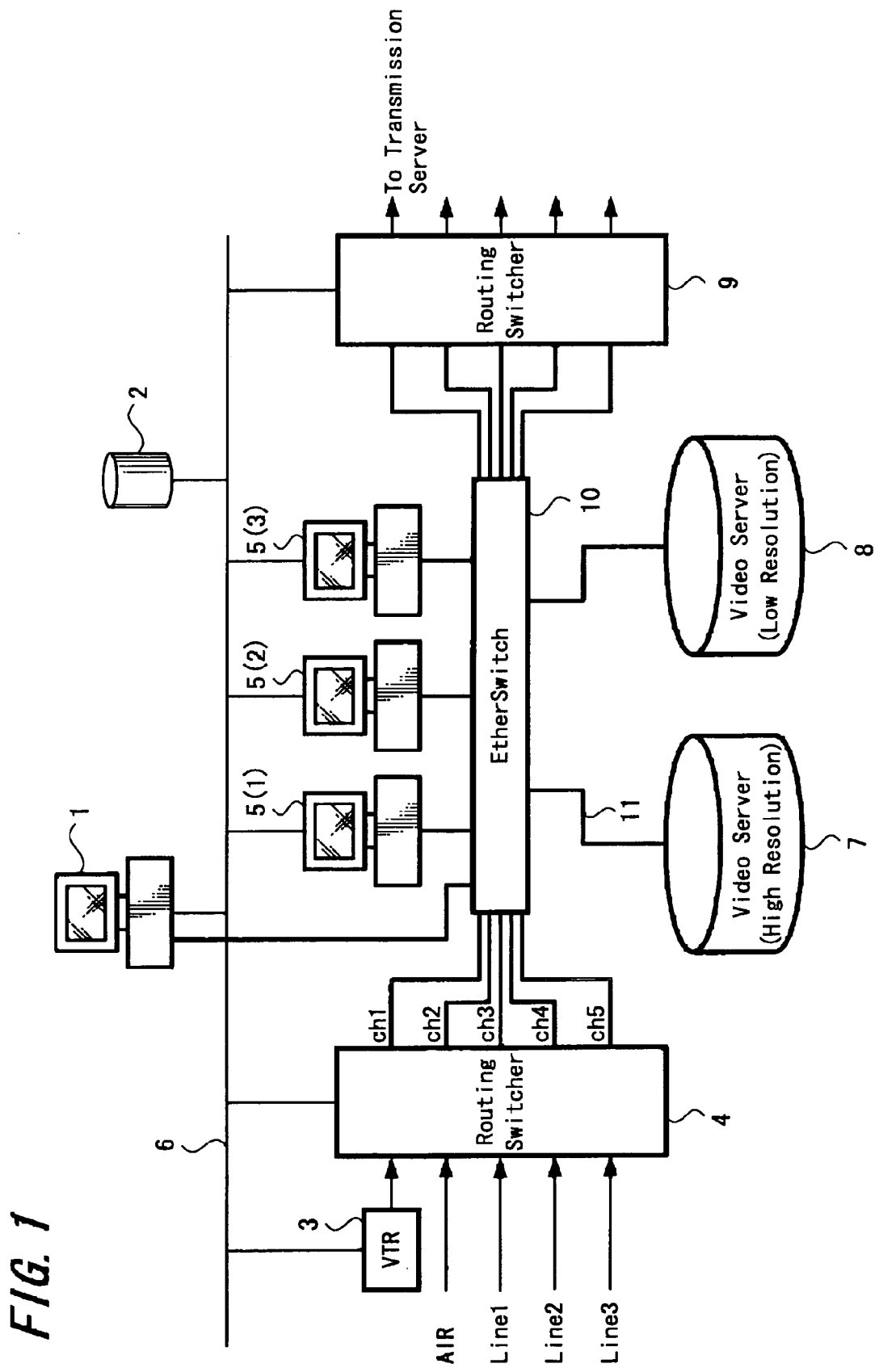
FIG. 1 is a block diagram showing the whole configuration of a recording, editing, and transmitting system according to an embodiment of the present invention.

FIG. 1 is a block diagram showing the whole configuration of a recording, editing, and transmitting system to which the present invention is applied. In this system, a management terminal 1, a data base 2, a VTR 3, a routing switcher 4, editing terminals 5(1) through 5(3), and a routing switcher 9 are mutually connected by Ethernet® 6.

Further, the management terminal 1, the routing switcher 4, the editing terminals 5(1) through 5(3), a video server (for high resolution) 7, a video server (for low resolution) 8, and the routing switcher 9 are mutually connected by gigabit Ethernet® 11 (shown with boldface lines) through Ether-Switch 10.

The routing switcher 4 is an apparatus for connecting each of input sources such as the VTR 3, another broadcasting station (described as AIR in this drawing), and television cameras on shooting locations connected by Internet or Intranet (described as Lines 1 through 3 in this drawing) to a desired channel among five systems of recording channels ch1 through ch5 of the video servers 7 and 8, respectively. A device that converts data of a SDI format from an input source into a format of the Ethernet is provided for each of the recording channels ch1 through ch5 on the output side of the routing switcher 4, although an illustration thereof is omitted.

The editing terminals 5(1) through 5(3) are terminals that edit a material by using low resolution video data (proxy video data) recorded in the video server 8.

The routing switcher 9 is an apparatus for connecting transmission channels of a plurality of systems in the video server 7 to desired transmission servers (not shown in the figure) respectively in a broadcasting station. A device that converts data of Ethernet format into that of the SDI format is also provided for each transmission channel on the input side of the routing switcher 9, although an illustration thereof is omitted.

The management terminal 1 is a terminal that controls the whole system to manage recording, editing, and transmission of a material, and includes a computer (for example, work station) that executes software to perform this management. This management software is installed from a recording medium such as a CD-ROM (however, as another example, this software may be downloaded and installed through a network). The data base 2 is used for storing various data made by the operation of the management terminal 1.

Figure 2:
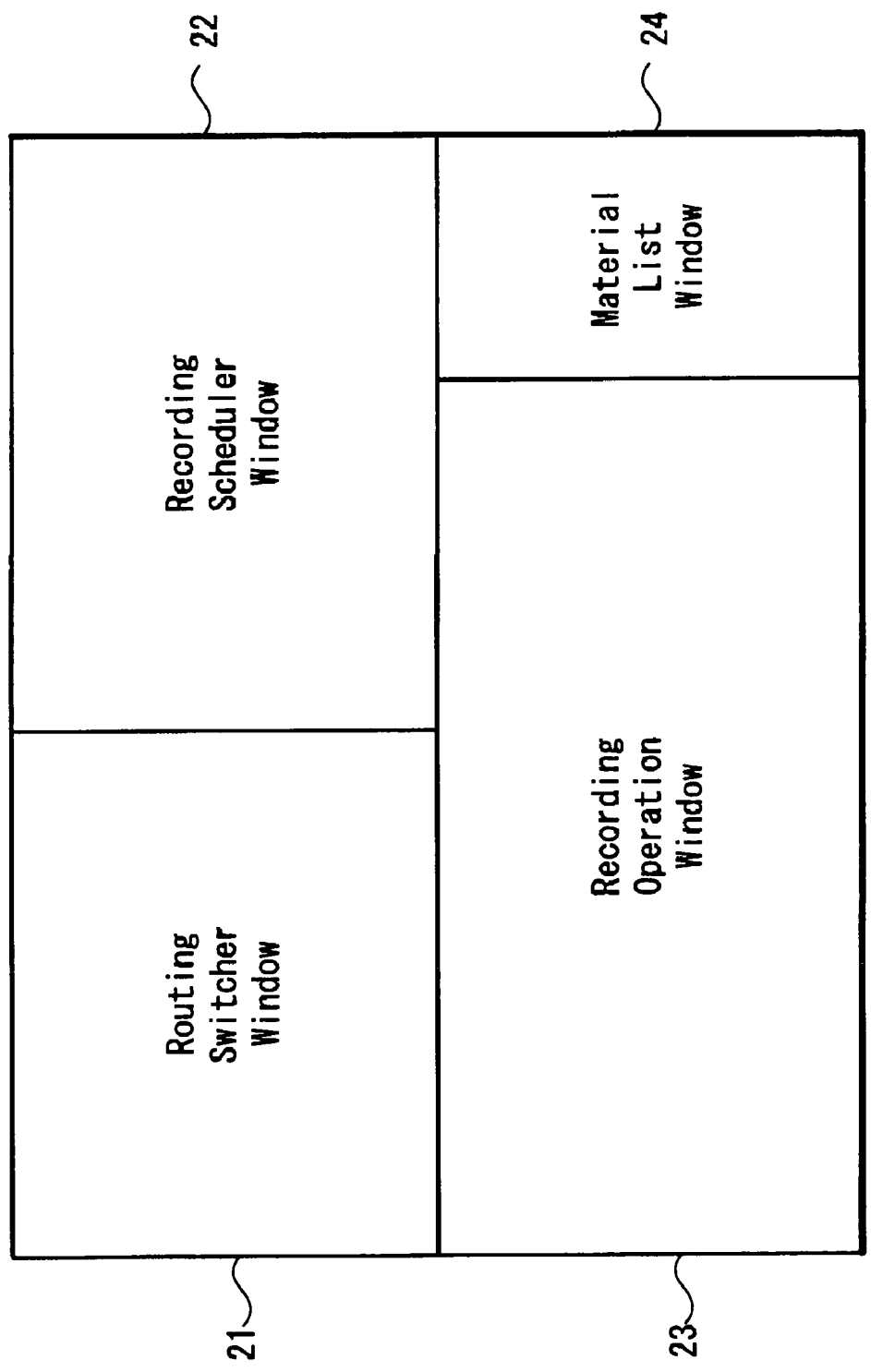
FIG. 2 is a diagram showing a configuration of a recording GUI screen displayed on a management terminal of FIG. 1.

FIG. 2 is a diagram showing a configuration of a material recording screen among GUI screens displayed on a display of the management terminal 1. A routing switcher window 21, a recording scheduler window 22, a recording operation window 23, and a material list window (a screen on which recorded material files are displayed as a list) 24 are provided in this recording GUI screen. These scheduler windows can also be magnified and displayed individually by selecting a command on a menu screen not illustrated in the figure.

Figure 3:
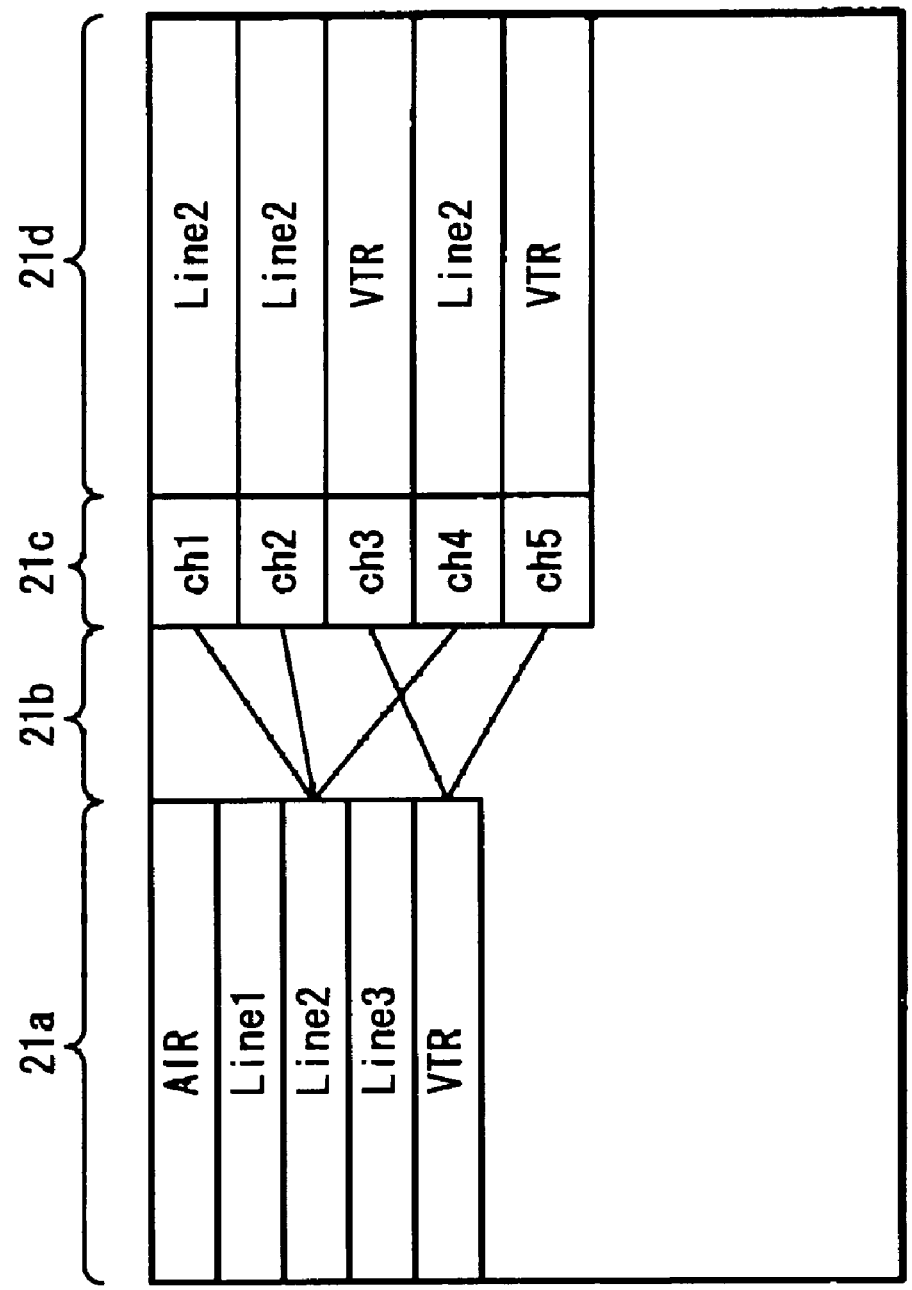
FIG. 3 is a diagram showing display contents of a routing switcher window of FIG. 2.

The routing switcher window 21 is a GUI screen for performing operation of connecting each of the above-described input sources (VTR 3, AIR, and Lines 1 through 3 of FIG. 1) to the recording channels ch1 through ch5. FIG. 3 shows display contents of the routing switcher window 21. An input source column 21a, a connection operation column 21b, a recording channel column 21c, and an input source column 21d are provided in the routing switcher window 21.

Each name of input sources (here, VTR, AIR, and Lines 1 through 3) is displayed in the input source column 21a. Each name of the recording channels (ch1 through ch5) of the video servers 7 and 8 is displayed in the recording channel column 21c.

The connection operation column 21b is a column for connecting the input source in the input source column 21a to a desired recording channel in the recording channel column 21c by an operation of a mouse, and a line connecting the input source and the recording channel that are mutually connected is displayed (in this drawing, the Line 2 is connected to the recording channels ch1, ch2, and ch4, and the VTR is connected to the recording channels ch3 and ch5).

The input source column 21d has a one-to-one correspondence to each recording channel in the recording channel column 21c, and the name of the input source connected to the relevant recording channel is displayed.

The management terminal 1 controls the routing switcher 4 (FIG. 1) based on an operation result in the routing switcher window 21 to connect each input source to the recording channels ch1 through ch5.

Figure 4:
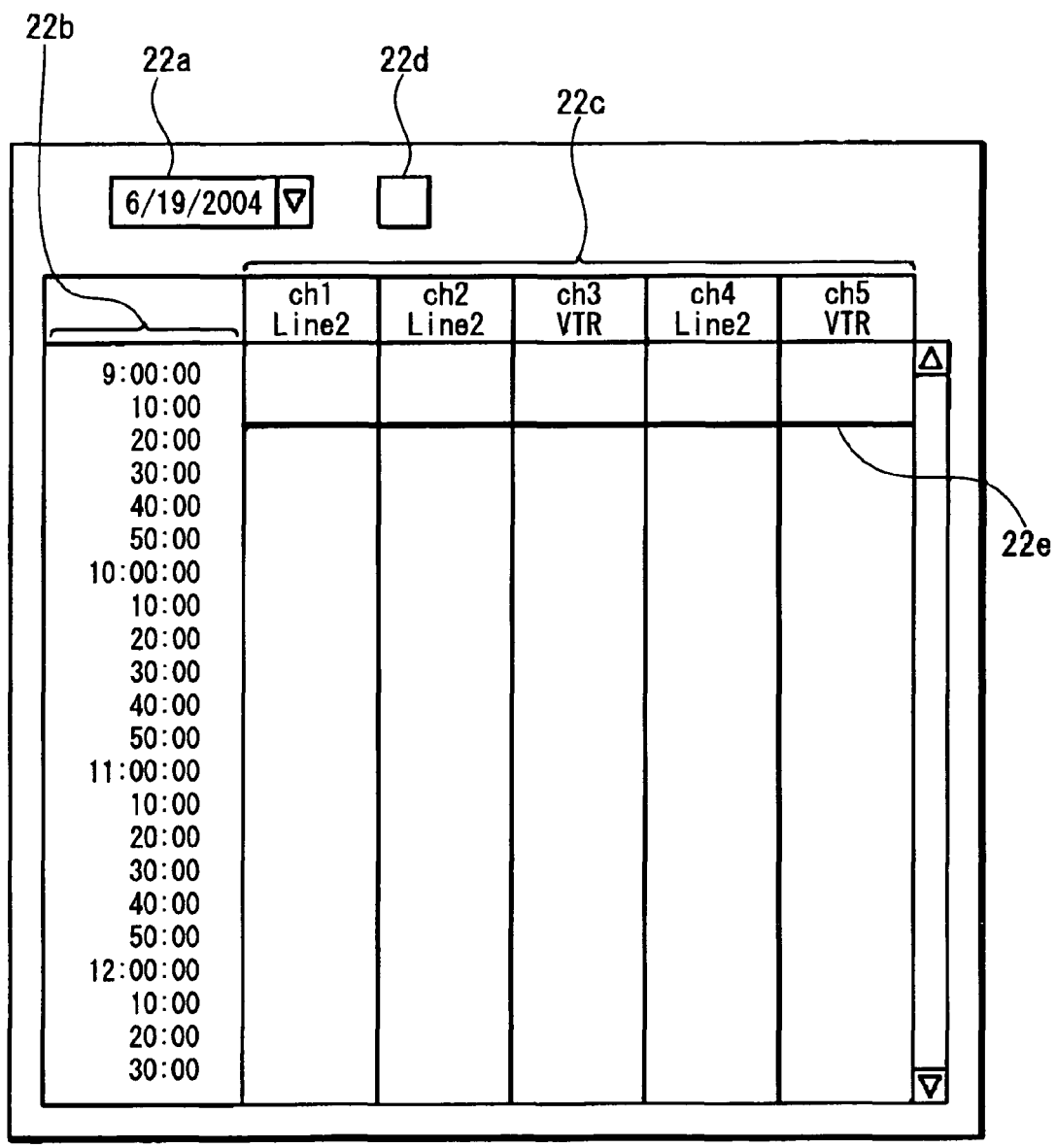
FIG. 4 is a diagram showing display contents of a recording scheduler window of FIG. 2.

The recording scheduler window 22 in FIG. 2 is a GUI screen in which an operation to schedule in advance the start time and end time of recording a material is performed and in which a recording event is displayed. FIG. 4 shows display contents of the recording scheduler window 22. A date column 22a, a time axis 22b, an event display column 22c, and a recording job button 22d are provided in the recording scheduler window 22.

Figure 5:
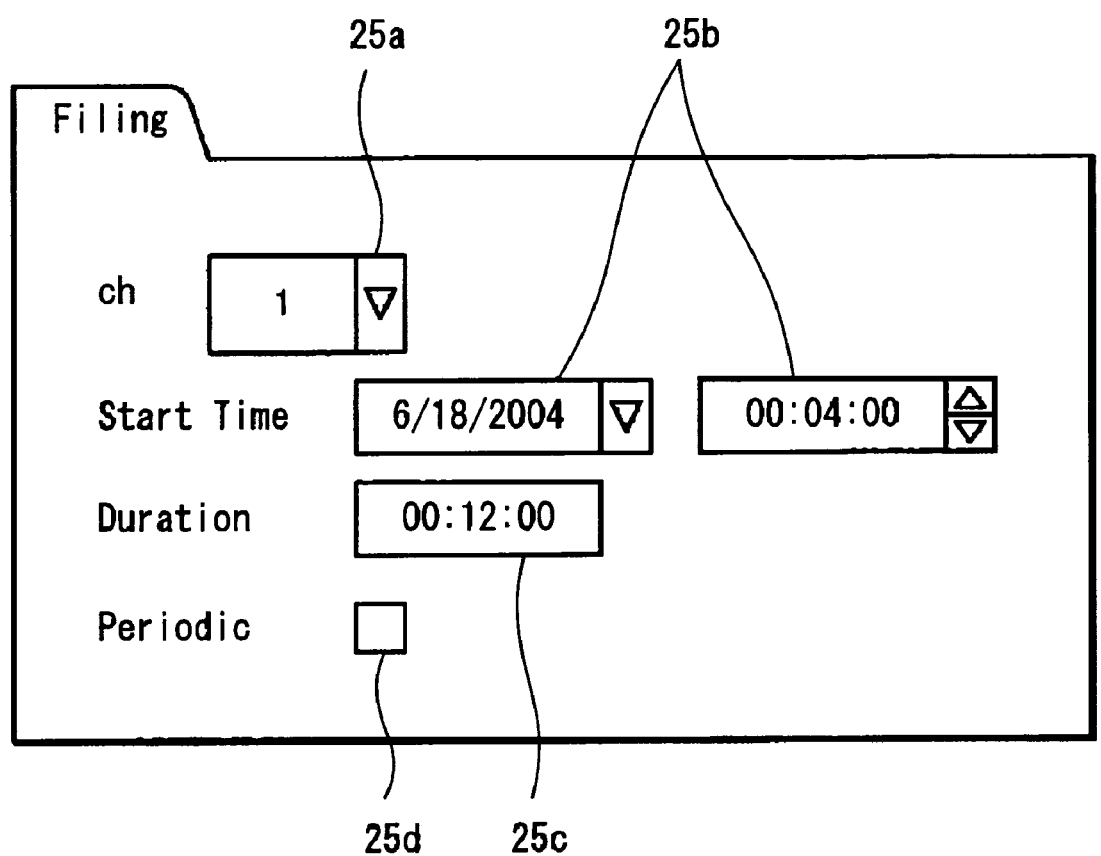
FIG. 5 is a diagram showing display contents of a recording job window.

The recording job button 22d is a button for opening another window (recording job window) for recording schedule operation. FIG. 5 shows display contents of the recording job window that is opened by an operation of this button 22d. A recording channel selection column 25a, a scheduled start date and time selection column 25b, a recording duration input column 25c, and a periodic schedule check column 25d are provided in the recording job window 25.

The recording channel selection column 25a is the column for selecting by a pull-down method a channel to be scheduled for a recording event among the recording channels ch1 through ch5.

The scheduled start date and time selection column 25b is a column for selecting by the pull-down method a year, month, day, and time of a scheduled start of a recording event. The recording duration input column 25c is a column for inputting a duration of a recording event.

The periodic schedule check column 25d is a column to check when recording is scheduled periodically at the same time zone (at the same time every day, every week, or every month). When the periodic schedule check column 25d is checked, another window for selecting a date of a scheduled start, a date of a scheduled end, or a pattern of periodicity (every day, every week, or every month) is opened, although an illustration thereof is omitted.

In addition, although an illustration is omitted, tabs for displaying a screen to input a title and the like of a recording material are also provided in the recording job window 25 other than a "Filing" tab shown in FIG. 5.

In FIG. 4, the date column 22a is a column for selecting by the pull-down method a date of a recording event to be displayed in the event display column 22c. The time axis 22b is an axis in which time from 0:00 to 24:00 is linearly displayed in the longitudinal direction, and a certain time zone is displayed (in this drawing, a time zone before 9:00 after 12:30) and the displayed time zone can be changed by scrolling up and down.

The event display column 22c is a column in which a display column for each of recording channels ch1 through ch5 is arranged in parallel in the longitudinal direction along the time axis 22b, and the column is scrolled up and down together with the time axis 22b. The name of the input source to which the connection is made in the routing switcher window 21 of FIG. 3 is also displayed under the name of each recording channel (ch1 through ch5) respectively.

When today's date is selected in the date column 22a and the time axis 22b of a time zone including the present time is displayed, a line indicating the present time is displayed in the lateral direction in the event display column 22c. A present time line 22e in the case where the present time is around 9:14 is displayed in this drawing.

Figure 6:
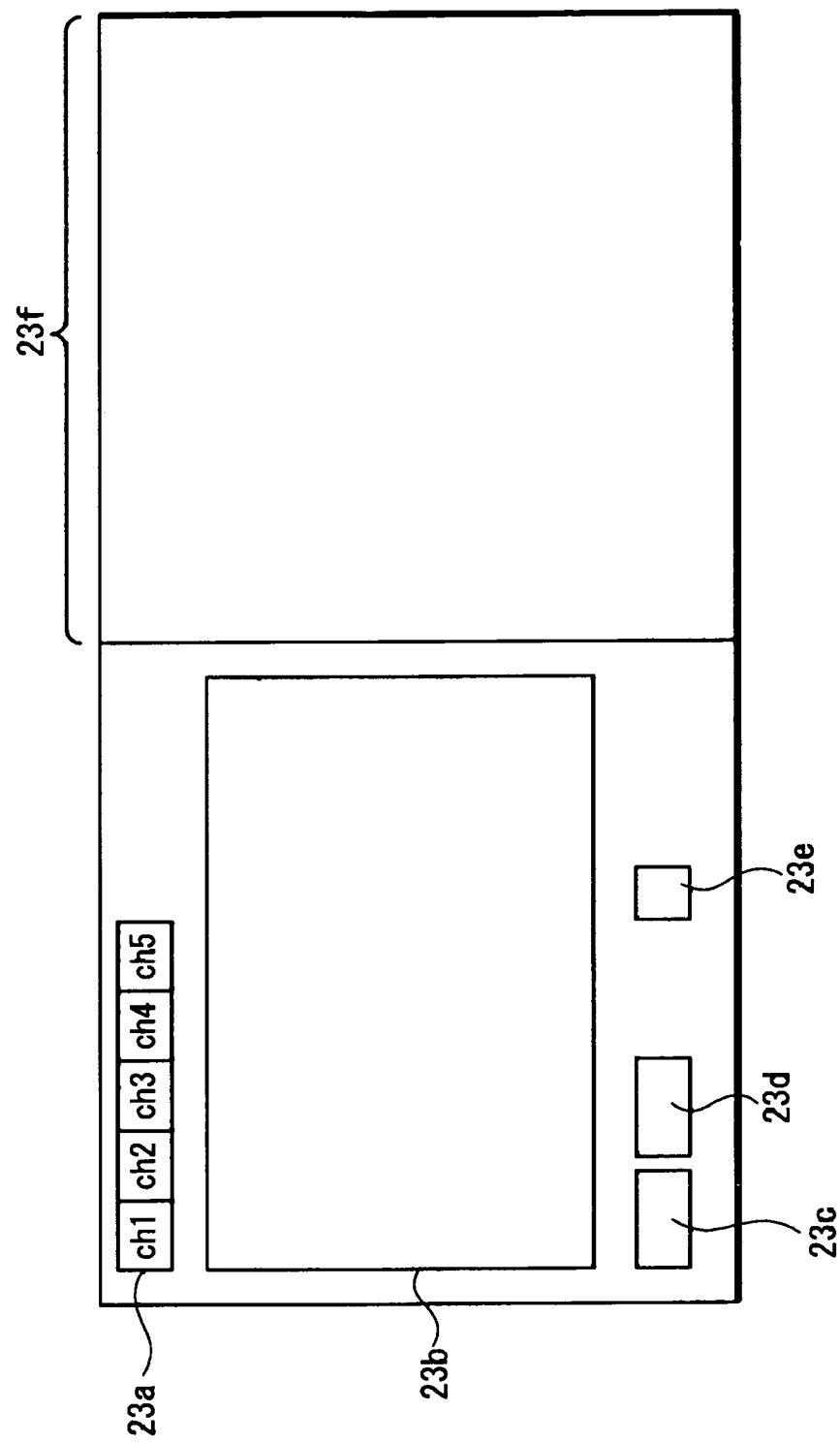
FIG. 6 is a diagram showing display contents of a recording operation window of FIG. 2.

The recording operation window 23 of FIG. 2 is a GUI screen for performing recording by a manual operation in accordance with a necessity of an unexpected recording. FIG. 6 shows display contents of the recording operation window 23. A recording channel selection button 23a, a monitor column 23b, a recording start button 23c, a recording end button 23d, a VTR button 23e, and a meta-data input column 23f are provided in the recording operation window 23.

The recording channel selection button 23a is a button for selecting a channel to perform recording among the recording channels ch1 through ch5. The monitor column 23b is a column in which video of a material to be recorded is displayed.

The recording start button 23c and recording end button 23d are buttons for starting and ending the recording, respectively. The VTR button 23e is a button to open a window for operating the VTR.

The meta-data input column 23f is a column for inputting meta-data of a title, category, and the like with respect to the material to be recorded although a detailed illustration thereof is omitted.

Figure 7:
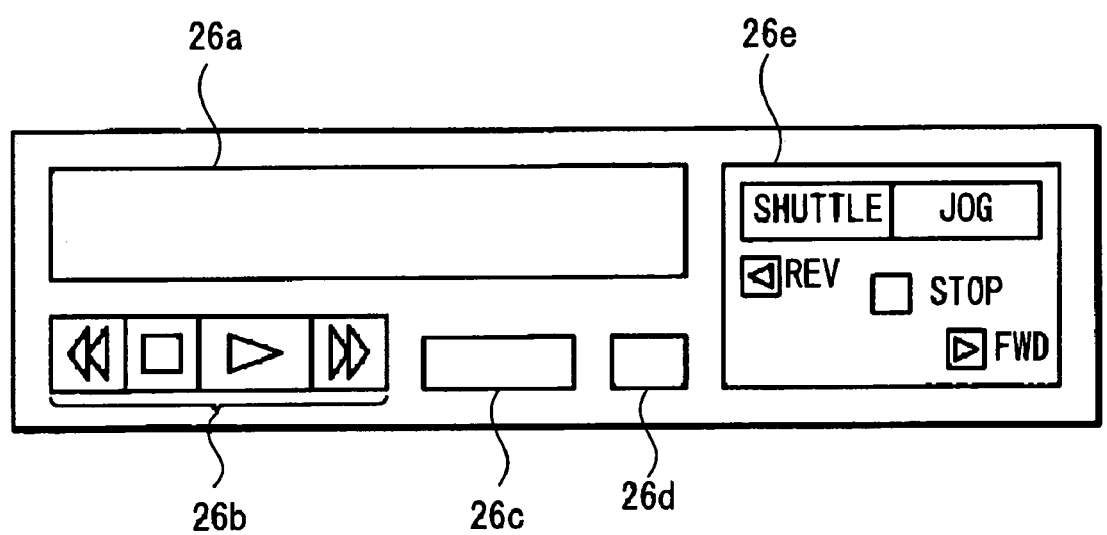
FIG. 7 is a diagram showing display contents of a VTR operation window.

FIG. 7 shows display contents of a VTR operation window that is opened by an operation of the VTR button 23e. In a VTR operation window 26 are displayed a device name and time code display column 26a, a control button 26b, a queue-up time code input column 26c, a queue-up button 26d, and a shuttle/jog control portion 26e are displayed.

The device name and time code display column 26a is a column in which a name of a VTR to be operated and a present time code are displayed. The control button 26b is a button for performing rewind, reproduction, stop, and fast forward operations of the VTR.

The queue-up time code input column 26c is a column to input a time code to queue up, and the queue-up button 26d is a button by which the time code input into the queue-up time code input column 26c is queued up.

The shuttle/jog control portion 26e is a column in which icons for performing a shuttle operation and jog operation of the VTR are provided.

The management terminal 1 controls the VTR 3 (FIG. 1) to reproduce a material from a videotape based on an operation result in this VTR operation window 26.

Next, an explanation is made with respect to the operation in which a recording event is displayed in the event display column 22c of the recording scheduler window 22 shown in FIG. 4.

When in the recording job window 25 of FIG. 5 a recording channel is selected and a recording start date and time and a recording end date and time are determined by selecting the scheduled start date and time and by inputting a recording duration, the management terminal 1 displays a time range from the scheduled recording start time to the scheduled recording end time along the time axis 22b in a column of the selected recording channel within the event display column 22c of FIG. 4 corresponding to the determined date.

Further, when it becomes the recording start time of a recording event scheduled in this recording job window 25 for any one of recording channels, the management terminal 1 controls the video servers 7 and 8 (FIG. 1) to record a material supplied from an input source connected to the recording channel is recorded in the high resolution and in the low resolution, respectively. Furthermore, when the VTR 3 (FIG. 1) is connected to the recording channel, the VTR 3 (FIG. 1) is controlled to reproduce the material from a videotape.

Further, when it becomes the scheduled recording end time of the recording event, the management terminal 1 controls the video servers 7 and 8 to end the recording (in case that the VTR 3 is connected to that recording channel, the VTR 3 is controlled to stop the reproduction).

Figure 8:
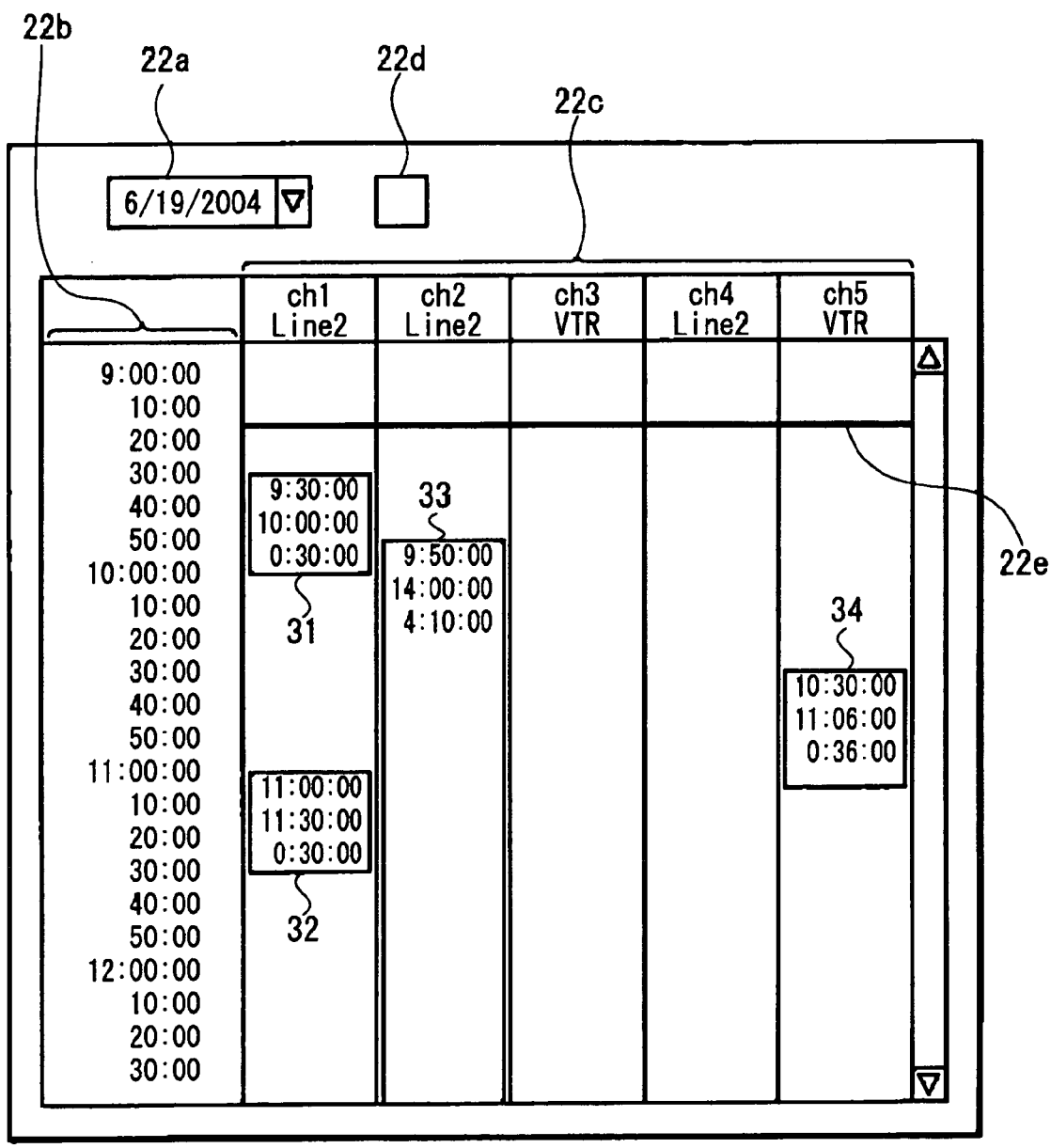
FIG. 8 is a diagram showing a display example of a scheduled recording event in the recording scheduler window.

FIG. 8 shows a display example of a recording event that is scheduled in this recording job window 25. In this example, a time range 31 of a recording event from 9:30 to 10:00 on Jun. 19, 2004 which is scheduled for the recording channel ch1 is displayed along the time axis 22b in a rectangular frame.

Further, a time range 32 of a recording event from 11:00 to 11:30 on the same date which is scheduled for the recording channel ch1, a time range 33 of a recording event from 9:50 to 14:00 on the same date which is scheduled for the recording channel ch2, and a time range 34 of a recording event from 10:30 to 11:06 on the same date which is scheduled for the recording channel ch5 are similarly displayed.

In each of the frames of the respective time ranges 31 through 34, numerals indicating the scheduled recording start time, scheduled recording end time, and duration are displayed in this order from the top. Note that a title is also displayed in this frame when the title of a material is input in the recording job window 25 but an illustration thereof is omitted here.

The time range of the recording event which is scheduled in the recording job window 25 such as these time ranges 31 through 34 has a fixed duration, and therefore the duration does not change once the time range is displayed.

Figure 9:
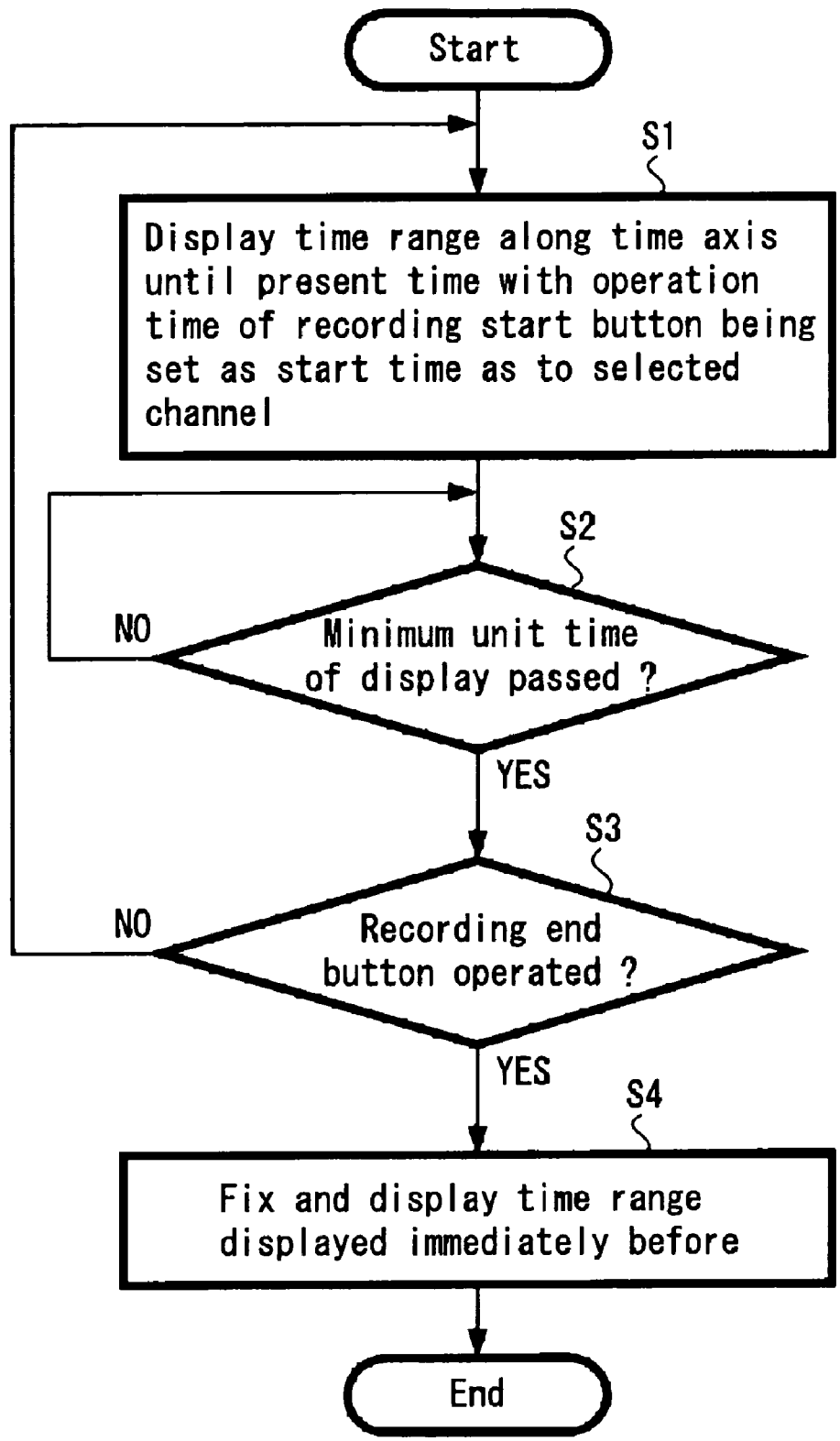
FIG. 9 is a flow chart showing display processing of a recording event by a manual operation in the recording operation window.

On the other hand, FIG. 9 is a flow chart showing display processing of a recording event which is executed by the CPU in the management terminal 1 based on a manual operation in the recording operation window 23 of FIG. 6 in accordance with a necessity of unexpected recording. When a recording channel is selected in the recording operation window 23, and when the recording start button 23c is operated (in the case where an input source is the VTR 3, a reproduction operation is performed in the VTR operation window 26 of FIG. 7 before the operation of the recording start button 23c), the CPU first displays a time range until the present time in a column of a recording channel selected in the event display column 22c of FIG. 4 along the time axis 22b by setting the time of the operation of the recording start button 23c as the start time (step S1).

Subsequently, the CPU waits until the minimum unit (for example, one minute) of the time range displayed in the event display column 22c elapses (step S2), and after that it is judged whether or not the recording end button 23d is operated in the recording operation window 23 (step S3). If it is judged NO, the process returns to step S1, and steps S1 through S3 are repeated. On the other hand, when the judgment becomes YES, a duration of a time range displayed immediately before is fixed and displayed (step S4), and then the processing is ended.

Further, the management terminal 1 controls the video servers 7 and 8 (FIG. 1) based on the operation in this recording operation window 23 to record a material supplied from the input source connected to the selected recording channel in the high resolution and in the low resolution, respectively, during a period from the operation of the recording start button 23c to the operation of the recording end button 23d (in the case where the VTR 3 is connected to the recording channel, the management terminal 1 also controls the VTR 3 based on the operation in the VTR operation window 26 of FIG. 7).

Figure 10:
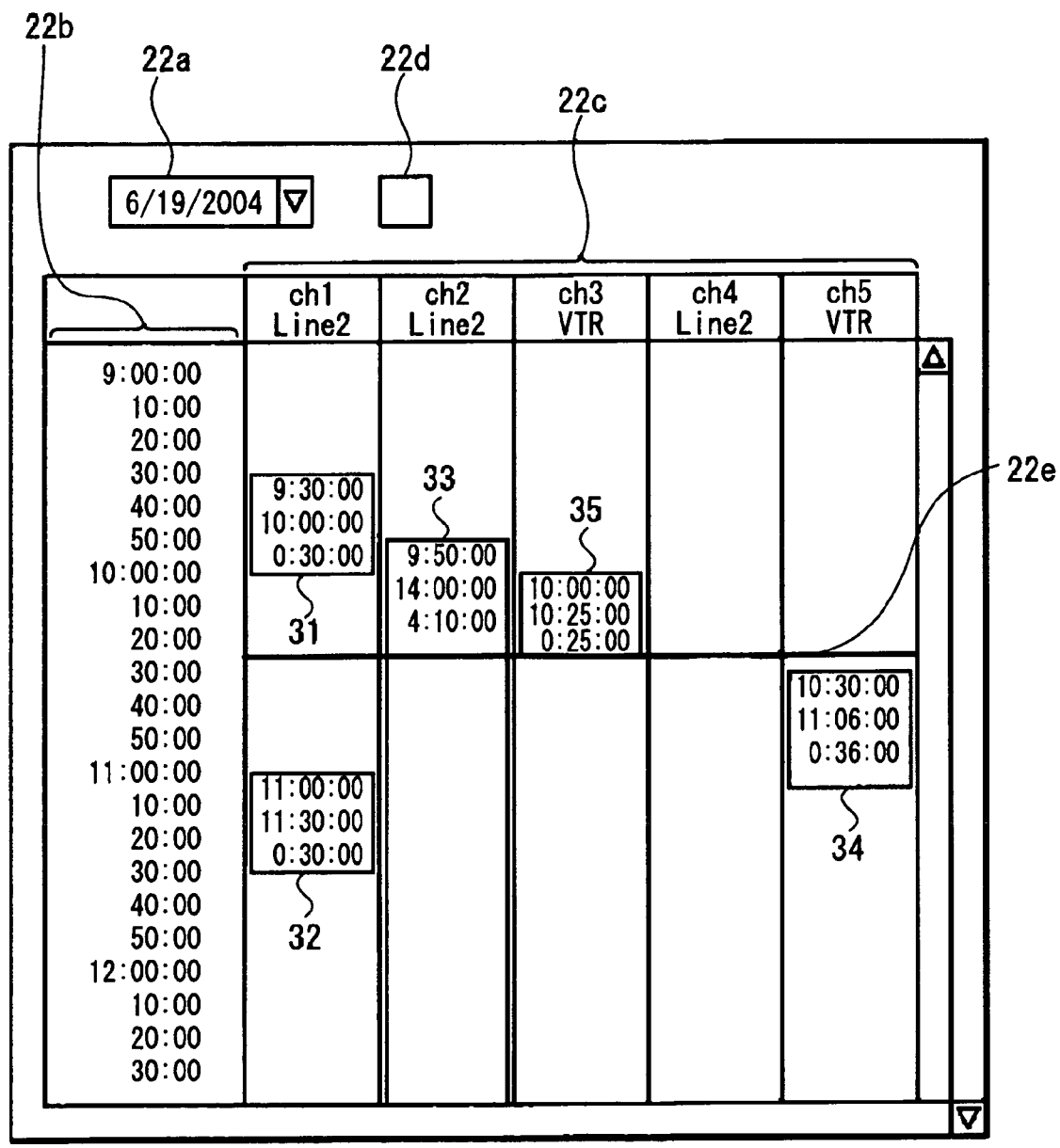
FIG. 10 is a diagram showing a display example of a recording event by a manual operation in the recording scheduler window.
Figure 11:
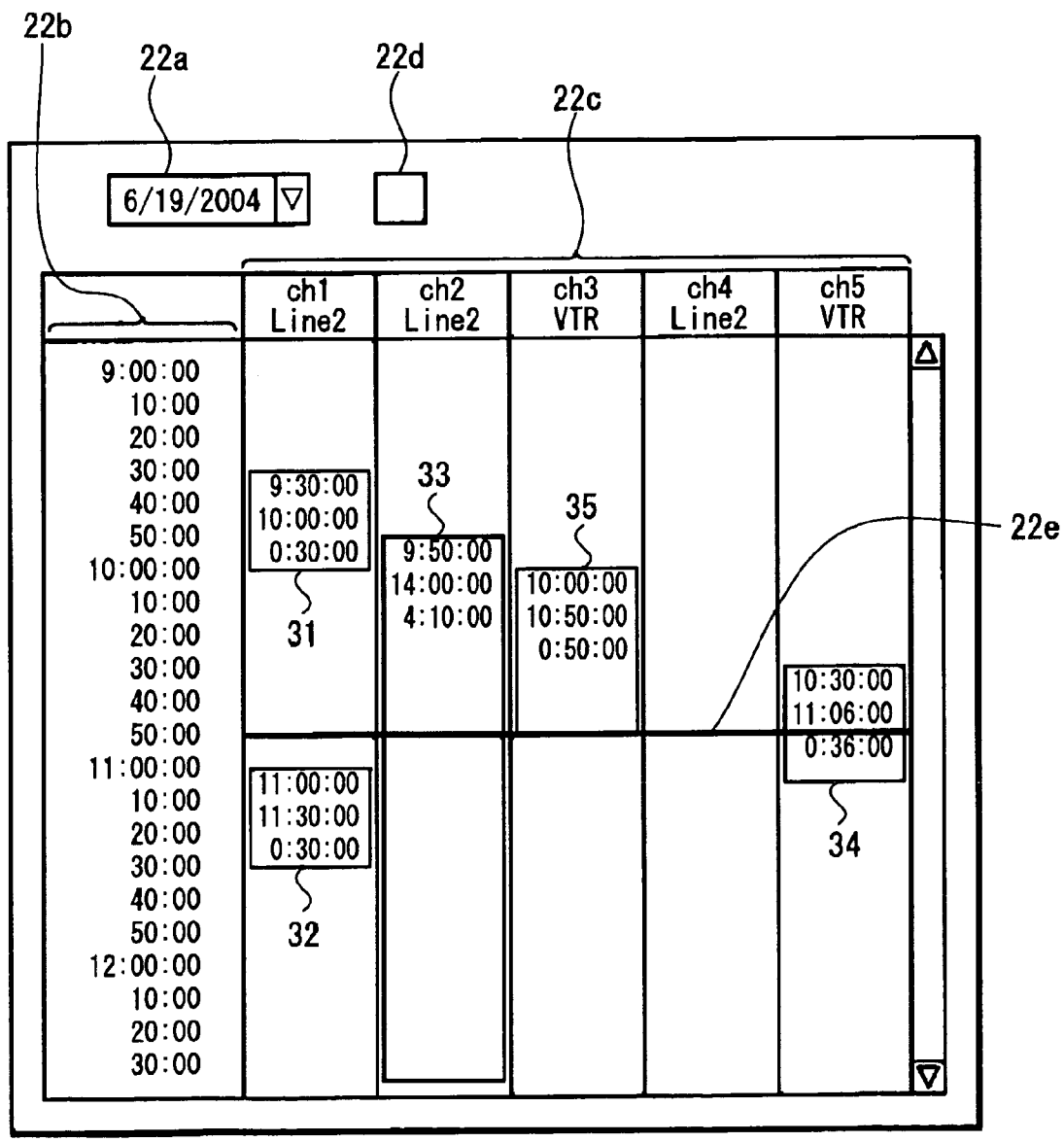
FIG. 11 is a diagram showing a display example of a recording event by a manual operation in the recording scheduler window.
Figure 12:
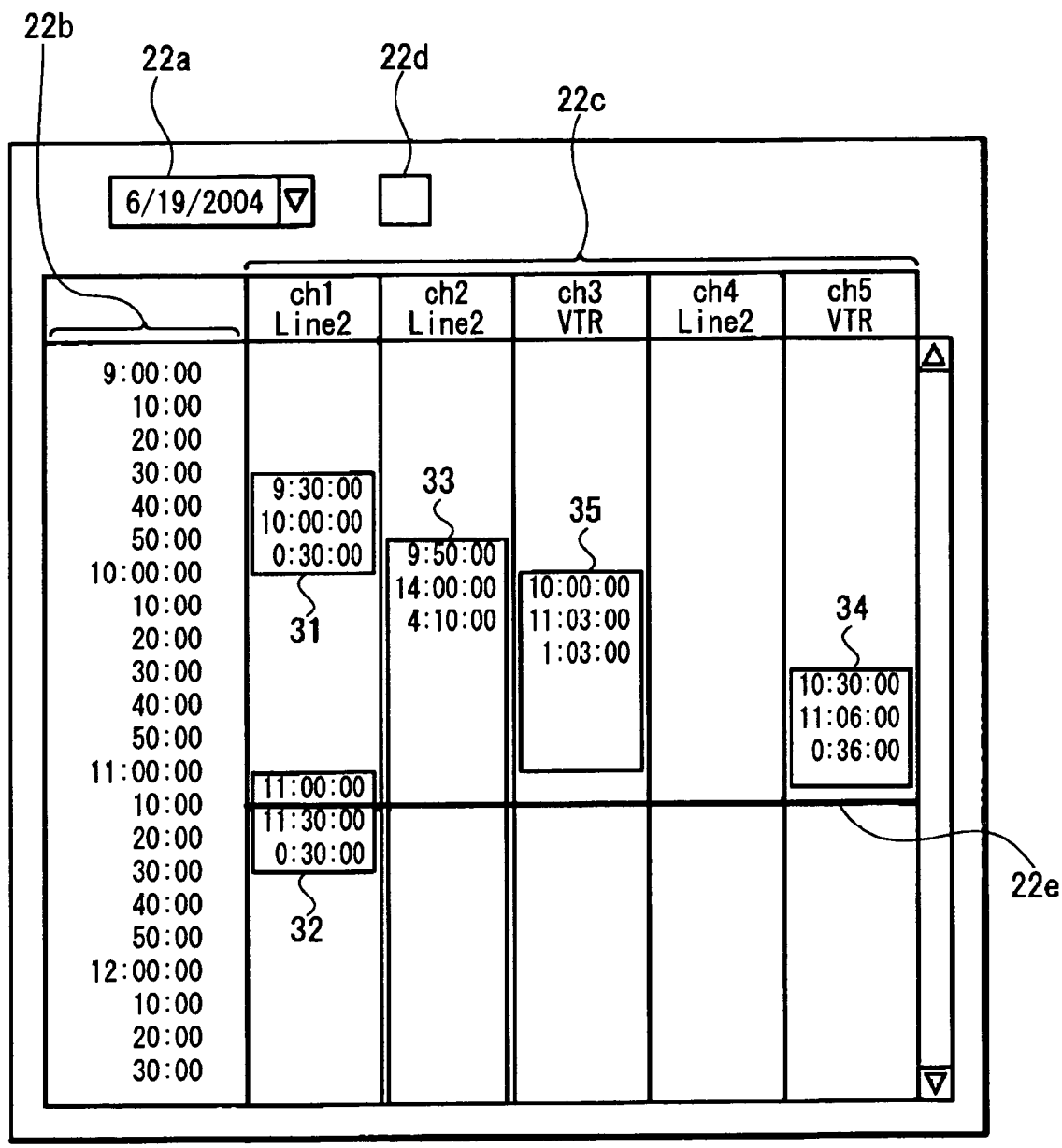
FIG. 12 is a diagram showing a display example of a recording event by a manual operation in the recording scheduler window.

FIGS. 10 through 12 chronologically show a display example of an unexpected recording event by an operation in the recording operation window 23, in which the recording channel ch3 is selected in a state where the time ranges 31 through 34 of the scheduled recording events of FIG. 8 are already displayed and the recording start button 23c is operated at 10:00 on Jun. 19, 2004, and the recording end button 23d is operated at 11:03 on this date.

In this example, since the recording end button 23d is not operated until 11:03, steps S1 through S3 of FIG. 9 are repeated, and thereby in the column of the recording channel ch3 in the event display column 22c, a time range of the unexpected recording event is displayed along the time axis 22b such that the time of 10:00 is set as a starting point and the time range extends as time elapses.

FIGS. 10 and 11 show a display state of a time range 35 of the unexpected recording event at the time of 10:25 and 10:50, respectively. In the display state of FIG. 10, the time range 35 extends to the present time of 10:25 (a position of the present time line 22e) with 10:00 being set as the starting point, and numerals showing the recording start time, present time (10:25), and duration (25 minutes) are displayed in this order from the top in the rectangular frame. (When a title of a material is input in the meta-data input column 23f, the title is also displayed in this frame, but an illustration thereof is omitted here.)

In the display state of FIG. 11, the time range 35 extends to the present time of 10:50 (a position of the present time line 22e) with 10:00 being set as the starting point, and numerals showing the recording start time, present time (10:50), and duration (50 minutes) are displayed in this order from the top in the rectangular frame.

Thus, the time range 35 of the unexpected recording event is displayed along the time axis 22b such that the time 10:00 is set as the starting point and this time range extends as time elapses until 11:03. Further, since the recording end button 23d is operated, after 11:03, the time range 35 at the time of 11:03 is fixed and displayed by proceeding to step S4 of FIG. 9.

FIG. 12 shows a display state of the time range 35 of the unexpected recording event at the time of 11:10. The time range 35 from 10:00 to 11:03 is displayed, and numerals showing the recording start time, recording end time (11:03), and duration (1 hour 3 minutes) are displayed in this order from the top in the rectangular frame.

As explained above, in this management terminal 1, when a recording event is scheduled in the recording job window 25 (FIG. 5), a time range of the recording event from the scheduled start time to the scheduled end time is displayed along the time axis 22b in the event display column 22c of the recording scheduler window 22 of FIG. 4.

In addition, when the recording start button 23c is operated in the recording operation window 23 in accordance with a necessity of an unexpected recording, a time range of the unexpected recording event is displayed along the time axis 22b in the event display column 22c such that the time of the operation is set as a starting point and this time range extends as time elapses until the recording end button 23d is operated.

Accordingly, the occurrence of the unexpected recording event can be known by this display, and it is judged that this unexpected recording event still continues while this time range keeps extending (for example, a state in FIGS. 10 and 11), and it is judged that this unexpected recording event has already ended when this time range does not extend any further (for example, a state of FIG. 12).

Further, as shown in FIGS. 10 and 11, a position of the present time line 22e is matched with a lower end of this time range when the unexpected recording event still continues, and on the other hand, the position of the present time line 22e departs from the lower end of this time range as shown in FIG. 12 after the unexpected recording event is ended, and so it is also possible to judge whether the unexpected recording event still continues or has already ended by the position of this present time line 22e.

Thus, a static display of a time range of a recording event scheduled in advance and a dynamic display of a time range of an unexpected recording event are performed along the same time axis 22b on the same screen. With this, all operators (a person in charge who has actually started the unexpected recording and all the other persons in charge among persons in charge of recording a material in a broadcasting station) can easily and visually know the occurrence of both the recording event scheduled in advance and the unexpected recording event.

Accordingly, such a situation can be avoided in which after a start of an unexpected recording, another person in charge happens to schedule recording of another material by setting the time before an end of the previous recording as the scheduled start time (recording of an unexpected material is interrupted by recording of another material).

Further, a static display of a time range of a recording event scheduled in advance and a dynamic display of a time range of an unexpected recording event are performed along the same time axis 22b on the same screen with respect to the plurality of recording channels ch1 through ch5. Therefore, when an unexpected recording is started and still continues in a certain recording channel, the recording channel can be avoided easily and a recording event can be scheduled in another recording channel. Hence, it is possible to schedule a recording event while easily coordinating with an unexpected recording event.

Here, in the examples described above, the time axis 22b is displayed linearly in the longitudinal direction in the recording scheduler window 22 such that the time range of the recording event is displayed along this time axis 22b in the longitudinal direction. However, the display is not limited to the above, but the time axis may be displayed linearly in a lateral direction such that the time range of the recording event is displayed along the time axis in the lateral direction. Alternatively, it is also possible that the time axis is displayed in a circumferential direction (such as a dial plate of a clock) to display the time range of the recording event along the time axis in the circumferential direction.

Moreover, in the examples described above, although the management terminal 1 is configured by using the computer in which the software is installed, the management terminal 1 is not limited thereto but may be configured by using a dedicated hardware device.

Further, in the examples described above, although the present invention is applied to the recording, editing, and transmitting system in the television broadcasting station, the present invention may be applied to other data recording system than the above. Furthermore, the present invention may be applied to management of an event other than the data recording (for example, may be applied to know both the schedule of a reserved use and an unexpected use for each room in a facility having a plurality of conference rooms, a lodging facility having many guest rooms, and the like).

It should be understood by those skilled in the art that various modifications, combinations, sub-combinations and alterations may occur depending on design requirements and other factors insofar as they are within the scope of the appended claims or the equivalents thereof.

What is claimed is:

1. An information management apparatus including a computer for scheduling recording events of materials that include video content, comprising:

display means for displaying data;

first operation means for scheduling the start time and end time of an event;

second operation means for performing an operation corresponding to the start time and end time of an unexpected event; and display control means for controlling the display means, displaying a time range of the event scheduled by said first operation means along a time axis on a screen of the display means, and for displaying a time range of the unexpected event along said time axis on said screen of said display means, wherein the time of the operation performed by said second operation means corresponding to the start of the unexpected event is set as the start point of the time range of the unexpected event, and the time range of the unexpected event is extended as time elapses until said second operation means perform the operation corresponding to the end time of the unexpected event, wherein the display control means displays the data representing the start time, the end time, and a duration of the unexpected event in a display area on the screen corresponding to the displayed time range of the unexpected event and updates the data representing the start time, the end time, and the duration of the unexpected event every predetermined period before the end time of the unexpected event, wherein the display control means displays the time range of the unexpected event along said time axis until present time and judges, in every minimum unit of the displayed time range, whether the operation is ended.

2. An information management apparatus according to claim 1, wherein said first operation means and said second operation means each select a system to perform an operation from a plurality of systems, and said display control means arrange in parallel display columns with respect to said plurality of systems along said time axis and display said time ranges in said display columns with respect to the systems selected by said first operation means and said second operation means.

3. An information management apparatus according to claim 1, wherein said event is a recording of the video content supplied from an outside apparatus.

4. An information management apparatus according to claim 1, wherein said display control means display said extension of the elapse of time along said time axis on said screen by using a line cursor that shows the present time.

5. An information management apparatus according to claim 2, wherein said event is a recording of the video content supplied from an outside apparatus.

6. An information management apparatus according to claim 2, wherein said display control means display said extension of the elapse of time along said time axis on said screen by using a line cursor that shows the present time.

7. An information management apparatus according to claim 5, wherein said display control means display said extension of the elapse of time along said time axis on said screen by using the line cursor that shows the present time.

8. An information management method of an information processing apparatus including a computer for scheduling recording events of materials that include video content, comprising:

a first step of displaying a time range of a scheduled event from the start time to end time along a time axis on a screen of display means based on an operation performed to schedule said start time and end time of the event; and a second step of displaying a time range of an unexpected event along said time axis on said screen of said display means based on an operation performed corresponding to the start time of the unexpected event, wherein the time of the operation performed is set as a starting point of the time range of the unexpected event and the time range of the unexpected event is extended as time elapses until an operation corresponding to an end time of the unexpected event is performed, wherein the second step displays the data representing the start time, the end time, and a duration of the unexpected event in a display area on the screen corresponding to the displayed time range of the unexpected event and updates the data representing the start time, the end time, and the duration of the unexpected event every predetermined period before the end of the unexpected event, wherein the second step displays the time range of the unexpected event along said time axis until present time and judges, in every minimum unit of the displayed time range, whether the operation is ended.

9. An information management method according to claim 8, further comprising the step of:

arranging display columns with respect to a plurality of systems in parallel along said time axis, wherein in said first step and said second step said time ranges are each displayed in said display columns with respect to the systems selected by the respective operations.

10. An information management method according to claim 8, wherein said event is a recording of the video content supplied from an outside apparatus.

11. An information management method according to claim 8, wherein said extension of the elapse of time is displayed along said time axis on said screen by using a line cursor that shows the present time.

12. An information management method according to claim 9, wherein said event is a recording of the video content supplied from an outside apparatus.

13. An information management method according to claim 9, wherein said extension of the elapse of time is displayed along said time axis on said screen by using the line cursor that shows the present time.

14. An information management method according to claim 12, wherein said extension of the elapse of time is displayed along said time axis on said screen by using the line cursor that shows the present time.

15. A non-transitory recording medium read by a computer for scheduling recording events of materials that include video content, comprising a program recorded to make a computer execute:

a first step of displaying a time range of a scheduled event from the start time to the end time along a time axis on a screen of display means based on an operation performed to schedule said start time and end time of the event; and a second step of displaying a time range of an unexpected event along said time axis on said screen of said display means based on an operation performed corresponding to the start time of the unexpected event, wherein the time of the operation is set as a starting point of the time range of the unexpected event and the time range of the unexpected event is extended as time elapses until an operation corresponding to the end of the unexpected event is performed, wherein the second step displays the data representing the start time, the end time, and a duration of the unexpected event in a display area on a screen corresponding to the displayed time range of the unexpected event and updates the data representing the start time, the end time, and the duration of the unexpected event every predetermined period before the end of the unexpected event, wherein the second step displays the time range of the unexpected event along said time axis until present time and judges, in every minimum unit of the displayed time range, whether the operation is ended.

16. A recording medium read by a computer according to claim 15, comprising a program recorded to make a computer further execute a step of:

arranging display columns with respect to a plurality of systems in parallel along said time axis, wherein in said first step and said second step said time ranges are each displayed in said display columns with respect to the systems selected by the respective operations.

17. A recording medium read by a computer according to claim 15, wherein said event is a recording of a program in which the video content supplied from an outside apparatus is recorded.

18. A recording medium read by a computer according to claim 15, wherein a program, to make said extension of the elapse of time displayed along said time axis on said screen by using a line cursor that shows the present time is recorded.

19. An information management apparatus including a computer for scheduling recording events of materials that include video content, comprising:

a display unit for displaying data;

a first operation unit for scheduling the start time and end time of an event;

a second operation unit for performing an operation corresponding to the start time and end time of an unexpected event; and a display control unit for controlling the display unit, displaying a time range from said start time to said end time of the event scheduled by said first operation unit along a time axis on a screen of the display unit, and for displaying a time range of the unexpected event along said time axis on said screen of said display unit, wherein the time of the operation performed by said second operation unit corresponding to the start time of the unexpected event is set as a start point of the time range of the unexpected event and the time range of the unexpected event is extended as time elapses until said second operation unit performs the operation corresponding to the end of the unexpected event, wherein the display control unit displays the data representing the start time, the end time, and a duration of the unexpected event in a display area on the screen corresponding to the displayed time range of the unexpected event and updates the data representing the start time, the end time, and the duration of the unexpected event every predetermined period before the end of the unexpected event, wherein the display control unit displays the time range of the unexpected event along said time axis until present time and judges, in every minimum unit of the displayed time range, whether the operation is ended.

* * * * *